United States Patent [19]

Graham et al.

[11] Patent Number: 5,119,770

[45] Date of Patent: Jun. 9, 1992

[54] MULTI-CYLINDER ENGINES

[76] Inventors: Arthur D. B. Graham, 1A Manning Street, Mosman Park, W. A. 6010; Neil D. N. Graham, 10 Hawford Way, Willetton, Western Australia 6055; David W. Jensen, 17/52 Helen Street, Lane Cove, N.S.W. 2066, all of Australia

[21] Appl. No.: 684,884

[22] PCT Filed: Oct. 26, 1989

[86] PCT No.: PCT/AU89/00467

§ 371 Date: Apr. 19, 1991

§ 102(e) Date: Apr. 19, 1991

[87] PCT Pub. No.: WO90/04725

PCT Pub. Date: May 3, 1990

[30] Foreign Application Priority Data

Oct. 26, 1988 [AU] Australia ............... PJ1180

[51] Int. Cl.$^5$ .................. F02B 75/22; F02B 75/32
[52] U.S. Cl. .................. 123/55 A; 123/55 R; 123/197.4
[58] Field of Search ............. 123/55 R, 55 A, 197.4

[56] References Cited

U.S. PATENT DOCUMENTS

| | | | |
|---|---|---|---|
| 683,587 | 10/1901 | Badeker | 123/55 A |
| 1,174,459 | 3/1916 | Winckler | 123/55 A |
| 1,316,864 | 9/1919 | Poschadel | 123/55 A |
| 1,365,667 | 1/1921 | Duchesne . | |
| 1,717,066 | 6/1929 | Rockwell . | |
| 1,988,119 | 1/1935 | Hill . | |
| 2,096,189 | 10/1937 | Miller . | |
| 2,226,940 | 12/1940 | Meyer et al. . | |
| 2,533,558 | 12/1950 | Chilton | 123/55 A |
| 2,671,436 | 3/1954 | Pitt et al. | 123/55 R |
| 2,894,414 | 7/1959 | Johnson . | |

FOREIGN PATENT DOCUMENTS

| | | | |
|---|---|---|---|
| 144111 | 11/1951 | Australia . | |
| 543370 | 6/1922 | France | 123/55 A |

*Primary Examiner*—E. Rollins Cross
*Assistant Examiner*—Thomas N. Moulis
*Attorney, Agent, or Firm*—Waldron & Associates

[57] ABSTRACT

In an internal combustion engine having two or more coplanar cylinders radially disposed about a crankshaft, a crankshaft journal bearing arrangement in which the big ends of the connecting rods are each formed as segments of a continuous circular bearing for assembly about a single crankshaft journal. The big end of each connecting rod comprises an internal arcuate bearing segment and concentric external bearing segments. When assembled about the crankshaft journal, the external bearing segments are encircled by two containment rings whereby the internal arcuate bearing segments are maintained in operational engagement with the crankshaft journal. The containment rings are fixed for rotation with the crankshaft and relative sliding movement between the containment rings and the assembled connecting rod big ends occurs at the external bearing segments.

13 Claims, 3 Drawing Sheets

MULTI-CYLINDER ENGINES

MULTI-CYLINDER ENGINES

This invention relates to multi-cylinder engines and in particular to engines having multiple cylinders in the same plane arranged in a generally radial formation about the axis of the crankshaft.

A common problem in engines with cylinders arranged in a radial formation is the coupling of more than one connecting rod to each eccentric journal of the engine crankshaft. Attempts to overcome this problem have been proposed, but there are various inherent problems with most prior proposals, particularly when it is contemplated incorporating those proposals in engines which require high power output from a small cubic displacement, thus necessitating engine speeds above about 2,500 R.P.M.

The general construction of radial engines of this construction has been disclosed in the following U.S. Pat. Nos:
2,226,940: Meyer et al
2,096,189: Miller
2,894,414: Johnson
1,988,119: Hill The disclosure in U.S. Pat. No. 2,894,414 is of particular interest as it discloses the use of rings to retain the plurality of connecting rods in the correct operating relation to the single crankshaft journal, the rings being secured to the crankshaft to rotate therewith. It is appreciated that advantages in lubrication can result from the ring rotating with the crankshaft, however, substantial problems exist in the construction proposed due to alignment difficulties arising from manufacturing tolerances.

It is well recognised that in the manufacture of machines of all types "tolerance - stackup" is of major concern in maintaining operating clearances between relatively moving components. This is particularly so in machinery such as engines where plain bearings are required to carry high loads and high rotational speeds with small clearance.

In the construction disclosed in U.S. Pat. No. 2,894,414, there is the usual situation where the connecting rod slipper has an internal bearing surface rotating relative to the crankshaft journal and an external bearing surface rotating relative to the retaining ring The clearance between the slipper and both the crankshaft journal and the retaining ring must both be maintained small for effective lubrication, and must also be sufficient to prevent locking up, particularly as a result of expansion under the high temperature conditions experienced in engines. It is to be noted that in the prior proposal the two retaining rings must each be accurately located with respect to the crankshaft journal and each other, but are rigidly secured to respective webs of the crankshaft at opposite ends of the crankshaft journal. Also bolts are used to effect the attachment of the retaining ring to the crankshaft webs, thus requiring aligning holes in the web and retaining ring.

It will be appreciated that it will be extremely difficult and also very costly to produce the various components above referred to while maintaning the very severely limiting tolerance necessary to achieve the required limited clearance between all bearing surfaces.

It is therefore the object of the present invention to provide a construction of an internal combustion engine having a generally radial formation of cylinders, whereby two or more connecting rods can be coupled to the same crankshaft journal in a simple and convenient manner, which is effective in operation and relatively economic to manufacture.

With that object in view there is provided an internal combustion engine having two or more cylinders with respective pistons mounted for reciprocation therein, a crankshaft having at least one eccentric crank journal, at least two of said pistons having respective connecting rods coupling the pistons to said one crank journal, said connecting rods reciprocating in a common plane normal to the crankshaft and journal axis, each said connecting rod having a bearing section including an internal arcuate bearing surface in engagement with the said one journal and a co-axial external arcuate bearing surface, the internal bearing surfaces of the said connecting rods engaging said journal in a concentric formation about the journal with the external bearing surfaces also in a concentric formation, a bearing ring concentric with the said one journal for load bearing engagement with the external bearing surfaces of said connecting rods to retain the internal bearing surfaces of said connecting rods in operational relationship to the said journal, said bearing ring inter-engaging with the crankshaft to rotate therewith and having limited movement relative thereto in the radial and axial directions Conveniently, the bearing ring is coupled to the crankshaft to rotate therewith. Preferably each connecting rod is provided with two external arcuate bearing surfaces, one adjacent to each axial end of the connecting rod, and two bearing rings are provided, one to co-operate with the external bearing surfaces at one axial end of the said two connecting rods, and the other bearing ring to co-operate with the external bearing surfaces at the opposite axial end of the connecting rods.

The connecting of the bearing ring to the crankshaft results in relative rotation between the bearing ring and the connecting rods. This relative rotation creates a sliding velocity between the engaging surfaces of the connecting rod and the bearing ring thereby enabling hydrodynamic lubricating principles to be employed. The ability to provide hydrodynamic lubrication to the surfaces transmitting loads between the connecting rods and the bearing ring increases the level of acceptable loads and so increases the speed at which the engine can operate and the power that can be developed.

The limited freedom of movement of the bearing ring in the radial and axial directions accommodates dimensional variation in the crankshaft connecting rods and bearing ring due to tolerancing so that the required clearances can be maintained between the bearing surfaces.

It will be appreciated that the major forces are transmitted between the connecting rods and the crankshaft of an engine when the gas pressure in the cylinder is high, and this force will hold the internal bearing surface of the connecting rod in contact with the crankshaft journal. By comparison the forces encountered tending to dis-engage the internal bearing surface of the connecting rod from the journal are considerably smaller and accordingly can be accommodated by a somewhat smaller bearing area of contact between the external bearing surfaces on the connecting rod and the bearing ring or rings. However, at high rotational speeds the centrifugal forces can be significant and the bearing ring must withstnd these forces and hold the connecting rod in the correct relationship to the crankshaft journal.

When the engine is operating as a supercharged engine there is, under normal circumstances, a gas pressure in the engine cylinder at all times that applies a load through the connecting rod to assist in maintaining the internal bearing surface in contact with the crankshaft journal at higher speeds. This situation is particularly appropriate in two stroke cycle engines.

One practical arrangement of the invention will now be described with reference to the accompanying drawings In the drawings.

Figure 2:
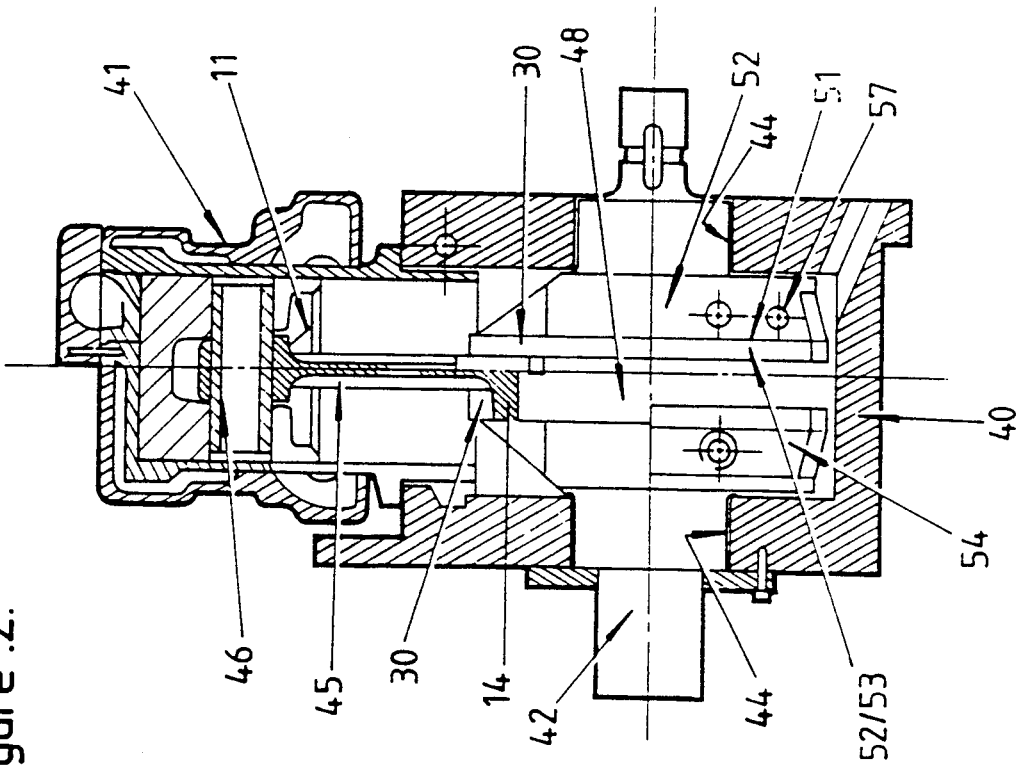
FIG. 2 is a sectional view along line 2—2 in FIG. 1.
Figure 1:
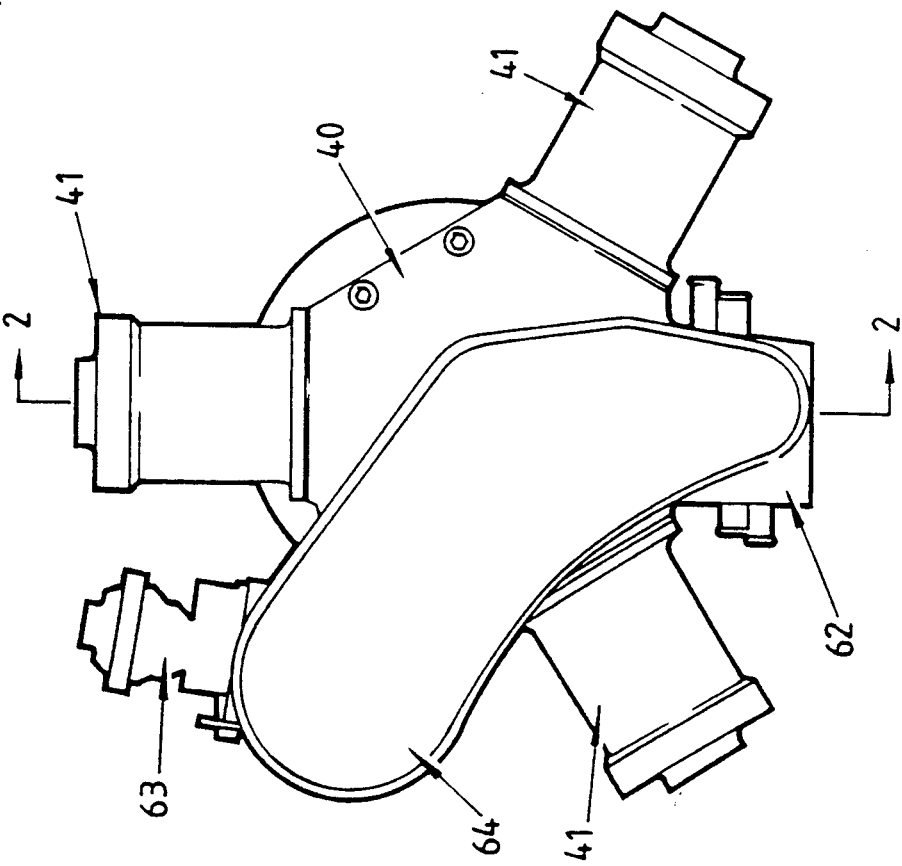
FIG. 1 is a side view of a three cylinder radial engine.

Referring now to FIGS. 1 and 2 of the drawings, wherein there is illustrated one arrangement of a three cylinder radial engine, in which is incorporated the present invention. The engine comprises a central crankcase 40 on which are mounted three identical cylinder units 41 with the axes of the three cylinder units co-planar and perpendicular to the rotational axis of the crankshaft 42 journalled in bearings 44 in the crankcase 40.

It is to be understood that the particular configuration of the cylinder units as shown in FIG. 1 is not limiting on the invention as the number of cylinder units located in the same plane is only limited by the number of connecting rods that may be accommodated on a single journal of the crankshaft, as hereinafter discussed in further detail. Further, in the engine illustrated, there is only a single eccentric journal on the crankshaft, however, the engine may incorporate a crankshaft with two or more eccentric journals with a plurality of co-planar cylinder units associated with each eccentric journal.

The crankshaft 42 is supported in the co-axial bearings 44 mounted in the opposite walls of the crankcase 40. The end 38 of the crankshaft is for coupling to the machine or equipment to be driven by the engine whilst the opposite end portion 49 of the crankshaft is to drive various auxilliary equipment required to operate the engine, such as the oil pump 62 and fuel pump 63 respectively. In FIG. 2 these components and the drive and drive housing 64 are omitted for clarity.

As seen in FIG. 2, each of the cylinder units has a reciprocating piston 39 mounted therein and a connecting rod 45 connected by the gudgeon pin 46 to the piston 39 and having a slipper end 14 which engages the eccentric journal of the crankshaft 42.

The three slippers 14 of the three connecting rods are held in running bearing relationship with the journal by the pair of bearing rings 30. The tongue 37 of the bearing rings abuts against the face 51 of the web 52 of the crankshaft and the opposite edges 52 and 53 of tongue 37 are received between balance weights 54 detachably secured to the web 52 of the crankshaft 42. In FIG. 2 of the drawings, the balance weight is removed from the web 52 of the crankshaft at the right hand side of the drawing, and is in place on the left hand side of the drawing. The bearing ring 30 is constructed so that the tongue 37 also acts as a balance weight so the bearing ring 30 is substantially in balance about the axis of the crankshaft 42

Figure 3:
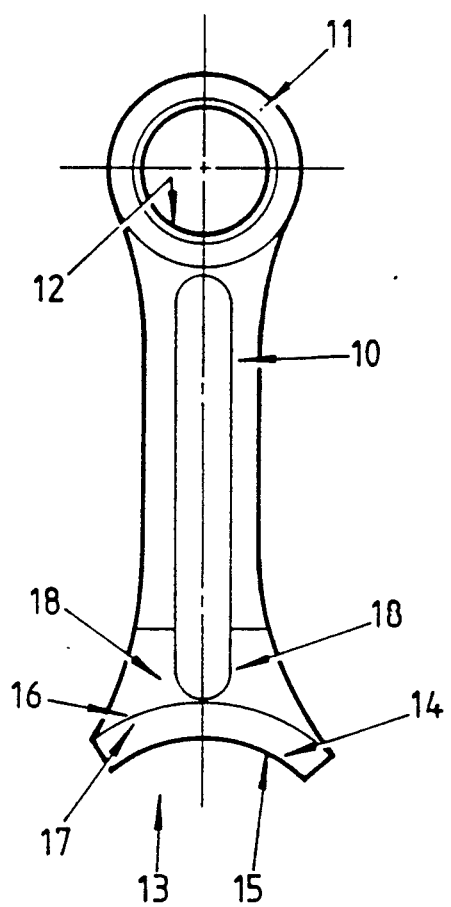
FIG. 3 is a side view of a single connecting rod.
Figure 4:
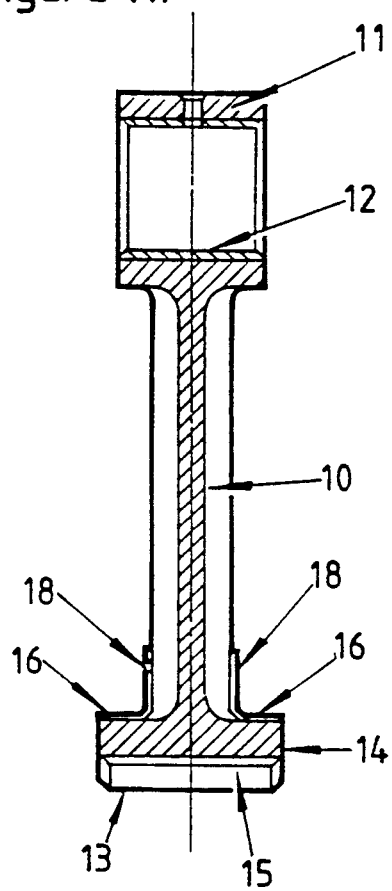
FIG. 4 is a longitudinal sectional view of the connecting rod in FIG. 3.

Referring now to FIGS. 3 and 4 of the drawings, the connecting rod 45 is of generally conventional construction except in the lower or big end area, which will be further described hereinafter. The central rod portion of the connecting rod is of the conventional webbed construction and the little end 11 receives the conventional gudgeon pin 46 to attach the connecting rod to the piston as further seen in FIG. 2 of the drawings.

At the big end 13 the connecting rod is not of the conventional full circle construction, but has an arcuate shaped slipper bearing 14 to co-operate with the engine crankshaft journal 48. The slipper bearing 14 has an internal arcuate bearing surface 15 and on either side of the central rod 10 there are external arcuate bearing surfaces 16, as can be clearly seen in FIG. 4. The bearing surfaces 15 and 16 being concentric. The slipper 14, in this instance, extends over an angle of arc of nominally 90°, the extent of this arc being in part dependent upon the number of connecting rods co-operating with the same crankshaft journal. The extent of angular movement of each connecting rod around the journal is also relevant to the number of connecting rods that may be received by the one crankshaft journal, this angular movement being dependent on the ratio of connecting rod length to piston stroke As can be seen in FIG. 3, the arcuate portion 17 of the connecting rod has a layer of bearing material bonded to the internal arcuate surface thereof to provide the internal bearing surface 15. Layers of similar bearing material are applied to the external arcuate surfaces of the arcuate portion 17 on either side of the central rod 10 to form arcuate bearing surfaces 16. Also as seen in FIG. 4, there is provided radial bearing surfaces 18 on either side of the central rod portion 10, extending from the bearing surface 16 to provide a lateral bearing to be engaged by the bearing rings 30, as will be further described. The bearing material forming the bearing surfaces 15, 16 and 18 may be sprayed or otherwise applied to the relevant portions of the surface of the connecting rod by known techniques to obtain an effective bond therebetween, and, if necessary, subsequently machined.

As can be seen in FIG. 3, the arcuate slipper bearing 14 is not located symmetrical to the axis of the connecting rod 10, and has a greater extent on that side of the centre line of the connecting rod which is leading with respect to the direction of rotation of the crankshaft, as indicated at 19. Conveniently the mid-point of the length of the slipper bearing 14 is offset about 7° from the connecting rod axis. This configuration of the slipper bearing assists in the development of the oil film between the crankshaft journal 48 and the bearing surface 15 on the connecting rod to establish and maintain hydrodynamic lubrication.

Figure 5:
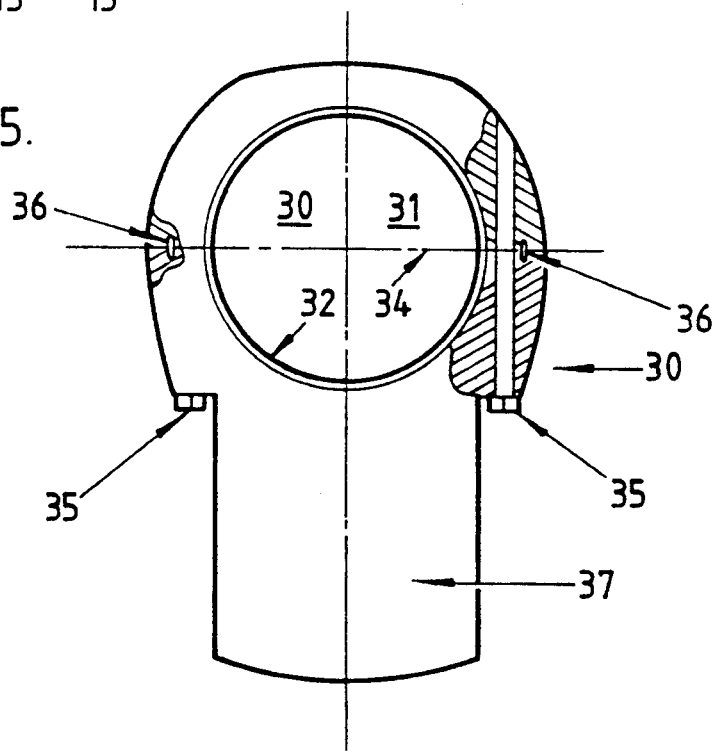
FIG. 5 is a view in the axial direction of a bearing ring.
Figure 6:
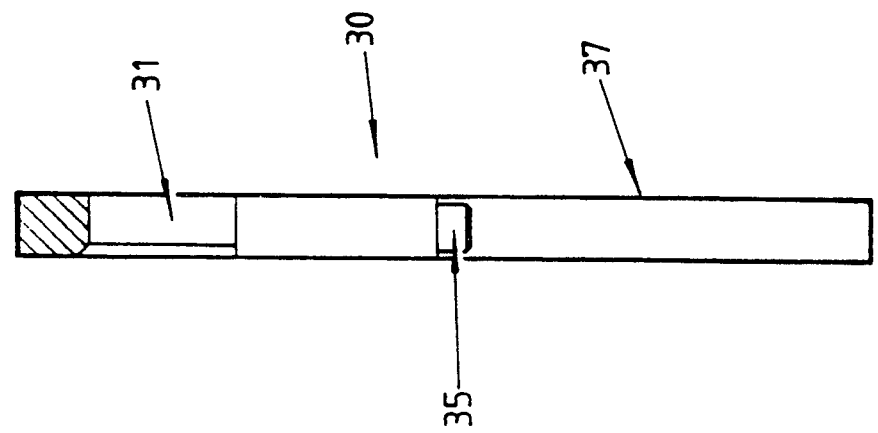
FIG. 6 is an end view of the bearing ring shown in FIG. 5.

Referring now to FIGS. 5 and 6, there is shown the bearing ring 30 as previously referred to with respect to FIGS. 1 and 2, two of such bearing rings being used to restrain a plurality of co-planar connecting rods 10 in engagement with the journal 48 of a crankshaft 42. The bore 31 in the ring portion 32 is a parallel bore extending completely through the retaining ring and having an internal bearing surface 32 of a diameter to mate with the external bearing surfaces 16 on the connecting rods. The ring portion 32 is divided along the diametral line 34 into two sections attached together by the studs 35, and accurately located in the required relative relation by the dowel pins 36.

Figure 7:
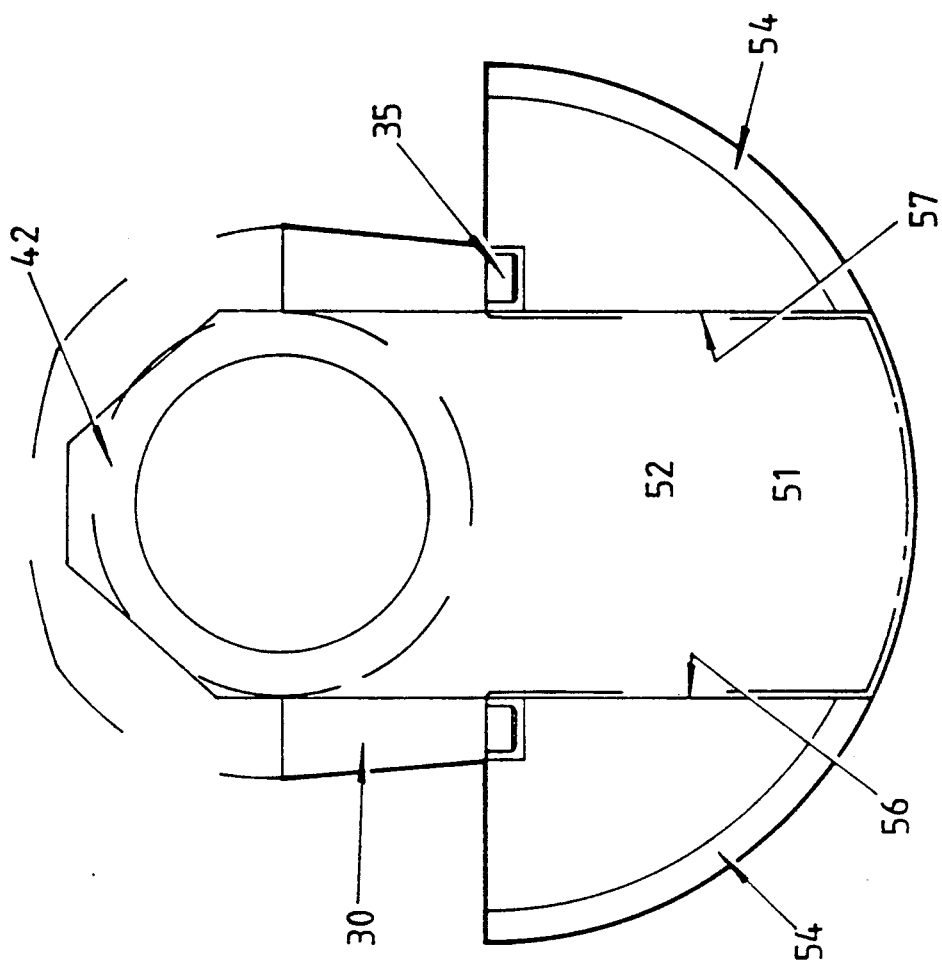
FIG. 7 is a cross-sectional view of the crankshaft with the bearing ring superimposed in broken outline.

The integral tongue portion 37 is dimensioned to be received in a close fit of the order of 1 mm clearance in a recess provided by the crankshaft balance weights 54 and web 52. As seen in FIG. 7 the web 52 of the crankshaft 42 has balance weights 54 secured to either side thereof which project in the axial direction of the crankshaft 42 beyond the face 51 of the web. The edge faces 56 and 57 of the respective balance weights 54 with the face 51 form the recess in which the tongue 37 of the bearing ring is received. The tongue 37 locates the ring portion relative to the crankshaft, to prevent rotation thereof relative to the journal to which it is fitted, and to also accommodate such flexing that may occur in the crankshaft or other components due to operational loads, and any misalignment between the journal, the bearing surfaces on the connecting rods and the central bore 31 in the bearing ring, due to manufacturing tolerances, or operational loads.

The above described construction of the bearing ring 30 and the engagement thereof with the crankshaft web enables clearances to be provided to permit limited movement between the bearing ring and the crankshaft in the radial and axial directions of the crankshaft.

The above construction of the engine is only by way of example and the engine may take many forms including an engine having a crankshaft with multiple eccentric journals and a plurality of connecting rods coupled in a co-planar relationship to each of the journals. Also the number of connecting rods co-operating with each crankshaft journal may vary from two to a practical limit of four, however, the maximum number can be varied in accordance with the diameter and axial length of the journal and the bearing loads to be transmitted from the connecting rod to the journal. The engine may operate on the spark ignited or diesel principal and equally may be of a two stroke or four stroke cycle operation. Preferably from the point of view of maximum power output, the air supply to the cylinders is pressurised above atmospheric pressure, such as by turbo charging, super charging, or "Comprex" (Registered Trade Mark) charger.

The claims defining the invention are as follows:

1. An internal combustion engine having two or more cylinders with respective pistons mounted for reciprocation therein, a crankshaft having at least one eccentric crank journal, at least two of said pistons having respective connecting rods coupling the pistons to said one crank journal, said connecting rods reciprocating in a common plane normal to the crankshaft and journal axis, each said connecting rod having a bearing section including an internal arcuate bearing surface in engagement with the said one journal and a co-axial external arcuate bearing surface, the internal bearing surfaces of the said connecting rods engaging said journal in a concentric formation about the journal with the external bearing surfaces also in a concentric formation, a bearing ring concentric with the said one journal for load bearing engagement with the external bearing surfaces of said connecting rods to retain the internal bearing surfaces of said connecting rods in operational relationship to the said journal, said bearing ring inter-engaging with the crankshaft to rotate therewith and having limited movement relative thereto in the radial and axial directions.

2. An internal combustion engine as claimed in claim 1 wherein each connecting rod has a bearing surface normal to said external arcuate bearing surface, to engage a surface of the bearing ring normal to the axis of the crankshaft.

3. An internal combustion engine as claimed in claim 1, wherein each connecting rod has a central elongate portion having the bearing section at one end thereof, said bearing section being of generally arcuate shape in the plane normal to the axis of the crankshaft, and having a continuous concave surface forming the internal bearing surface and two axially spaced convex surfaces, one on either side of the central elongate portion, forming respective concentrate external bearing surfaces, said connecting also having two radial bearing surfaces each in a respective plane normal to the axis of the crankshaft and on opposite sides of the central portion of the connecting rod adjacent the respective external bearing surfaces.

4. An internal combustion engine as claimed in claim 1, wherein the bearing ring includes a ring portions with a through bore in which the bearing sections of the connecting rods are received in spaced assembly about the eccentric journal, with the external bearing surfaces of the bearing sections in rotational engagement therewith, said bearing ring also including a tongue portion integral with the ring portion projecting in a direction radial to said bore and inter-engaged with the crankshaft to rotate therewith.

5. An internal combustion engine as claimed in claim 1, wherein the eccentric journal is supported by, and extends between, respective web portions of the crankshaft, each web portion having balance weight portions carried thereby, the tongue of the bearing ring being received in a recess defined by the web and balance weights, and extending in a radial direction to the axis of the crankshaft.

6. An internal combustion engine as claimed in claim 1, wherein the balance weights are demountably attached to the web.

7. An internal combustion engine as claimed in claim 1, where the bearing ring is substantially balanced with respect to the axis of the crankshaft.

8. An internal combustion engine as claimed in claim 2, wherein the bearing ring includes a ring portion with a throught bore in which the bearing sections of the connecting rods are received in spaced assembly about the eccentric journal, with the external bearing surfaces of the bearing sections in rotational engagement therewith, said bearing ring also including a tongue portion integral with the ring portion projecting in a direction radial to said bore and inter-engaged with the crankshaft to rotate therewith.

9. An internal combustion engine as claimed in claim 3, wherein the bearing ring includes a ring portion with a throught bore in which the bearing sections of the connecting rods are received in spaced assembly about the eccentric journal, with the external bearing surfaces of the bearing sections in rotational engagement therewith, said bearing ring also including a tongue portion integral with the ring portion projecting in a direction radial to said bore and inter-engaged with the crankshaft to rotate therewith.

10. An internal combustion engine as claimed in claim 2, wherein the eccentric journal is supported by, and extends between, respective web portions of the crankshaft. each web portion having balance weight portions carried thereby, the tongue of the bearing ring being received in a recess defined by the web and balance weights, and extending in a radial directions to the axis of the crankshaft.

11. An internal combustion engine as claimed in claim 3, wherein the eccentric journal is supported by, and extends between, respective web portions of the crankshaft, each web portion having balance weight portions carried thereby, the tongue of the bearing ring being received in a recess defined by the web and balance weights, and extending in a radical direction to the axis of the crankshaft.

12. An integral combustion engine as claimed in claim 2, wherein the balance weights are demountable attached to the web.

13. An integral combustion engine as claimed in claim 3, wherein the balance weights are demountably attached to the web.

* * * * *